US010055422B1

(12) United States Patent
Addaguduru

(10) Patent No.: US 10,055,422 B1
(45) Date of Patent: Aug. 21, 2018

(54) DE-DUPLICATING RESULTS OF QUERIES OF MULTIPLE DATA REPOSITORIES

(71) Applicant: EMC Corporation, Hopkinton, MA (US)

(72) Inventor: Chandra Mouli Addaguduru, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 324 days.

(21) Appl. No.: 14/108,706

(22) Filed: Dec. 17, 2013

(51) Int. Cl.
*G06F 17/30* (2006.01)

(52) U.S. Cl.
CPC .............. *G06F 17/30156* (2013.01)

(58) Field of Classification Search
CPC ................................. G06F 17/30545
USPC ........................................ 707/692
See application file for complete search history.

(56) References Cited

U.S. PATENT DOCUMENTS

| 8,943,024 B1* | 1/2015 | Gardner | G06F 17/30156 707/640 |
| 2011/0078112 A1* | 3/2011 | Takata | G06F 17/30156 707/622 |
| 2011/0178996 A1* | 7/2011 | Pendlebury | G06F 11/1453 707/692 |
| 2011/0282868 A1* | 11/2011 | Ishii | G06F 17/30011 707/722 |
| 2013/0124562 A1* | 5/2013 | Christensen | G06F 17/30864 707/770 |
| 2013/0339314 A1* | 12/2013 | Carpentier | G06F 3/0641 707/692 |
| 2014/0280084 A1* | 9/2014 | Dulitz | G06F 17/30489 707/723 |

\* cited by examiner

*Primary Examiner* — Jorge A Casanova
(74) *Attorney, Agent, or Firm* — Dergosits & Noah LLP; Todd A. Noah

(57) ABSTRACT

De-duplicating results of queries of data repositories is described. A system associates each data object of the first set of duplicate data objects stored by multiple data repositories with a first unique duplicate set identifier, and each data object of the second set of duplicate data objects stored by the multiple data repositories with a second unique duplicate set identifier. The system identifies a first data object of the first set of duplicate data objects and a second data object of the first set of duplicate data objects in response to a query. The system determines that the first data object is associated with the first unique duplicate set identifier, and that the second data object is also associated with the first unique duplicate set identifier. The system outputs a query result that includes only the first data object.

17 Claims, 5 Drawing Sheets

300

| Data Objects 302 | Duplicate 304 | Duplicate Set Identifier 306 |
|---|---|---|
| Object A |  | 0 |
| Object B |  | 1 |
| Object C |  | 2 |
| Object D |  | 3 |
| Object E | A | 0 |
| Object F |  | 4 |
| Object G | A | 0 |
| Object H |  | 5 |
| Object I | D | 3 |
| Object J | C | 2 |
| Object K | D | 3 |
| Object L | C | 2 |
| Object M | C | 2 |
| Object N |  | 6 |
| Object O |  | 7 |
| Object P | N | 6 |
| Object Q | N | 8 |
| Object R |  | 6 |
| Object S |  | 9 |
| Object T |  | 10 |

*FIG. 3*

DE-DUPLICATING RESULTS OF QUERIES OF MULTIPLE DATA REPOSITORIES

BACKGROUND

An enterprise content management system provides online access to content stored using digital technology, information formerly available only on paper, microfilm, or microfiche. An enterprise content management system generates new metadata about content as the content is checked in and out. Information about how and when content is used can enable an enterprise content management system to generate new filtering, routing and search pathways, and retention-rule decisions. In addition, an enterprise content management system provides access to data about email and instant messaging, which may be used in business decisions. The audit trail generated by an enterprise content management system enhances document security, and provides metrics to help measure productivity and identify efficiency.

Because many documents may cross multiple departments and affect multiple processes, an enterprise content management system provides integrated solutions for multiple departments and systems. For example, imaging, document management, and workflow can be combined in a customer service department to enable customer service agents to better resolve customer inquiries. Likewise, an accounting department may access supplier invoices from an electronic resource management system, access purchase orders from an imaging system, and access contracts from a document management system as part of an approval workflow. Similarly, an organization may present information via the World Wide Web, which requires managing web content.

In enterprise content management systems, data objects are stored by many heterogeneous repositories. An electronic discovery product can search and collect data objects from these heterogeneous repositories. The probability of having duplicate objects, such as documents and emails, stored by these repositories is very high.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 3 illustrates an example portion of a duplicates table for de-duplicating results of queries of multiple data repositories, under an embodiment;

DETAILED DESCRIPTION

Producing "de-duplicated" search results based on a query submitted by a user of the electronic discovery product can save a lot of time and expense for the user. In order to enable accurate de-duplicated search results for queries, a hash function may designate one copy of a set of copies as a unique master copy and designate the rest of the copies in the set of copies as duplicate copies, with the unique master copy serving as the representative of the entire set of copies. Consequently, a metadata query might not identify the unique master copy for a query. Furthermore, whenever data objects are added or deleted, the hash function has to recalculate the sets of copies. Additionally, deletion of a unique master copy results in significant processing work, as the hash function needs to identify and designate one of the duplicate copies of the unique master copy's set of copies as the new unique master copy of the set of copies.

Embodiments herein enable de-duplicating results of queries of multiple data repositories. A system associates each data object of the first set of duplicate data objects stored by multiple databases with a first unique duplicate set identifier, and each data object of the second set of duplicate data objects stored by the multiple databases with a second unique duplicate set identifier. For example, the query result deduplicator tool assigns the duplicate set number 1 to the duplicate data objects A and B and assigns the duplicate set number 2 to the duplicate data objects C and D.

The system identifies a first data object of the first set of duplicate data objects and a second data object of the first set of duplicate data objects in response to a query. For example, the query result deduplicator tool identifies the data object A stored by a first data repository and the data object B stored by the second data repository as both satisfying a query for a custodian named "Bill" and a filepath that equals "/MyDir/sample."

The system determines that the first data object is associated with the first unique duplicate set identifier, and that the second data object is also associated with the first unique duplicate set identifier. For example, the query result deduplicator tool identifies the duplicate set number 1 for both of the data objects A and B, which indicates that the data objects A and B are duplicates of each other. The system outputs a query result that includes only the first data object. For example, the query result deduplicator tool outputs a query result that identifies only the data object A as satisfying the specified query. The query result deduplicator tool enables a user who submitted a query to save any time that would have been wasted attempting to identify duplicate objects, and save system resources that would have been wasted retrieving and printing duplicate objects unnecessarily.

Figure 1:
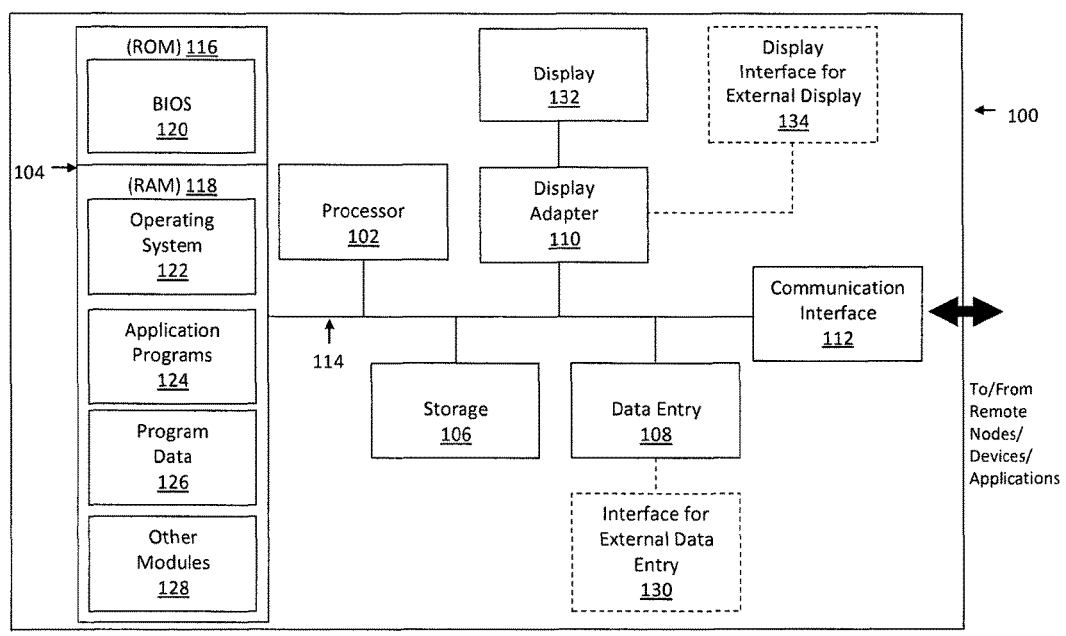
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

The methods described herein can be embodied in executable instructions stored in a computer readable medium for use by or in connection with an instruction execution machine, apparatus, or device, such as a computer-based or processor-containing machine, apparatus, or device. Those skilled in the art will appreciate that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for de-duplicating results of queries of multiple data repositories.

Figure 2:
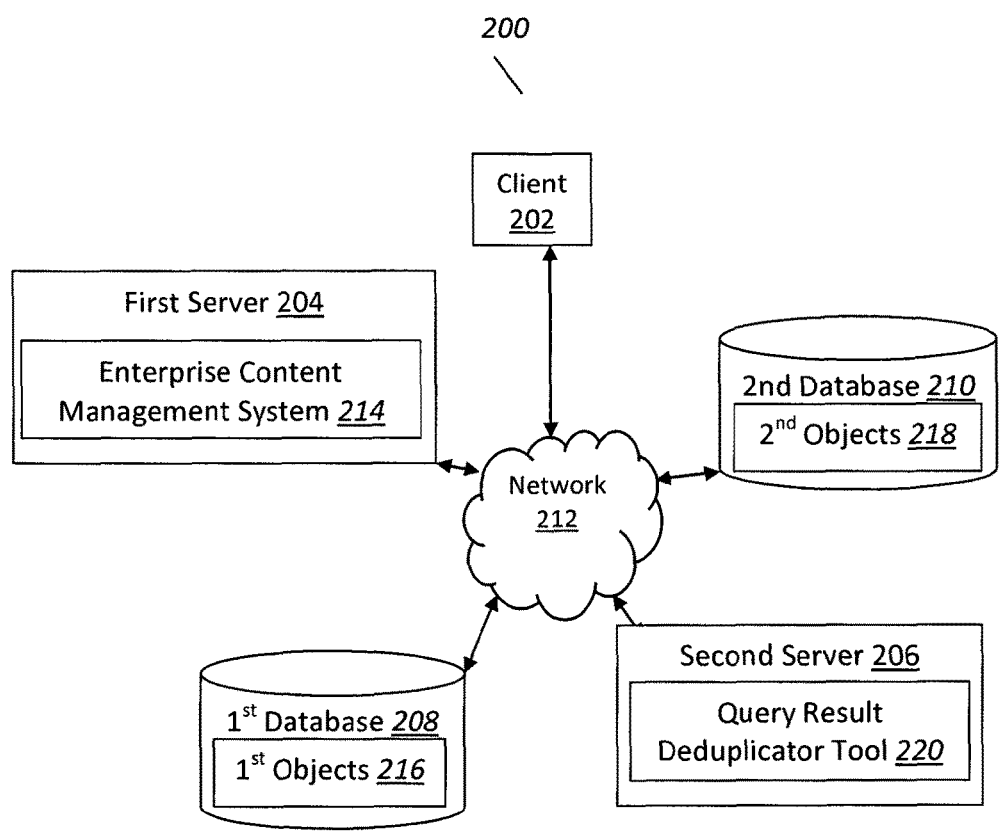
FIG. 2 illustrates a block diagram of an example system for de-duplicating results of queries of multiple data repositories, under an embodiment.

FIG. 2 illustrates a block diagram of a system that implements de-duplicating results of queries of multiple data repositories, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a first server 204 and a second server 206 that are provided by a hosting company. The client 202, the servers 204-206, a first database 208, and a second database 210 communicate via a network 212. The first server 204 includes an enterprise content management system 214 associated with the first database 208, which includes first objects 216, and the second database 210, which includes second objects 218, while the second server 206 includes a query result deduplicator tool 220, which de-duplicates results of queries of the first database 208 and the second database 210. The databases 208-210 may be referred to as Documentum® databases 208-210 provided by EMC® Corporation. Alternatively, the databases 208-210 may be some other database known in the art. The client 202 and the servers 204-206 may each be substantially similar to the system 100 depicted in FIG. 1. Although FIG. 2 depicts only one client 202, two servers 204-206, two databases 208-210, one network 212, and one of each of the system elements 214-220, the system 200 may include any number of clients 202, servers 204-206, databases 208-210, networks 212, and each of the system elements 214-220.

The system 200 identifies a first set of duplicate data objects and a second set of duplicate data objects stored by multiple data repositories. For example, the query result deduplicator tool 220 identifies a first set of duplicate data objects A and B, where the object A is stored with the first objects 216 by the first database 208, and the object B is stored with the second objects 218 by the second database 210. In another example, the query result deduplicator tool 220 identifies a second set of duplicate data objects C and D, where the object C is stored with the first objects 216 by the first database 208, and the object D is stored with the second objects 218 by the second database 210. The query result deduplicator tool 220 may identify sets of duplicate data objects based on comparing hash values associated with the data objects 216-218 stored by the databases 208-210. For example, the query result deduplicator tool 220 calls a hash function for each of the objects 216-218 stored by the databases 208-210, and compares the hash values returned by the hash function to identify which of the objects 216-218 are duplicates of the other objects 216-218 stored by the databases 208-210. Although the examples describe the data repositories as databases 208-210 for the enterprise content management system 214, the data repositories may be any types of data repositories. A less simplified example of duplicate data objects is described below in reference to FIG. 3.

The system 200 associates each data object of a first set of duplicate data objects with a first unique duplicate set identifier, and each data object of a second set of duplicate data objects with a second unique duplicate set identifier. For example, the query result deduplicator tool 220 assigns the duplicate set number 1 to the duplicate data objects A and B and assigns the duplicate set number 2 to the duplicate data objects C and D. A less simplified example of duplicate set identifiers is described below in reference to FIG. 3.

The system 200 receives a query. For example, the query result deduplicator tool 220 receives a query for data objects whose metadata indicates a custodian named Bill and whose filepath equals "/MyDir/sample." The query may be any combination of a metadata query, such as a metadata query that specifies an assigned reviewer or a metadata query that specifies a create, an access, and/or a modify time, a content query, and a combined metadata and content query.

The system 200 identifies a first data object of a first set of duplicate data objects and a second data object of the first set of duplicate data objects based on the query. For example, the query result deduplicator tool 220 identifies the data object A stored by the first database 208 and the data object B stored by the second database 210 as both satisfying the query for a custodian named "Bill" and a filepath that equals "/MyDir/sample." The first data object and the second data object may be stored in different data formats. For example, the query result deduplicator tool 220 identifies the object A as document content stored in the Microsoft® Word format and the object B as the same document content stored in the portable document format (PDF). Unlike the hash functions designations used by prior art electronic discovery products, neither the first data object, nor the second data object, nor any other data object is designated as a master copy for the set of duplicate data objects. A less simplified example of data objects identified in response to a query is described below in reference to FIG. 4.

The system 200 determines that a first data object is associated with a first unique duplicate set identifier, and that a second data object is also associated with the first unique duplicate set identifier. For example, the query result deduplicator tool 220 identifies the duplicate set number 1 for both of the data objects A and B, which indicates that the data objects A and B are duplicates of each other. A less simplified example of duplicate set identifiers is described below in reference to FIG. 4.

The system 200 outputs a query result that includes a first data object. For example, the query result deduplicator tool 220 outputs a query result that identifies only the data object A as satisfying the specified query. A less simplified example of a de-duplicated query result is described below in reference to FIG. 5.

The system 200 may store a third data object in a data repository of multiple data repositories. For example, the query result deduplicator tool 220 stores the object U with the first objects 216 stored by the first database 208.

The system 200 may identify a third data object as corresponding to a first set of duplicate data objects. For example, the query result deduplicator tool 220 identifies the object U as a duplicate of the object A, which is also stored with the first objects 216 by the first database 208.

The system 200 may associate a third data object with a first unique duplicate set identifier. For example, the query result deduplicator tool 220 assigns the duplicate set number 1, which is already assigned to the object A, to the object U. In contrast to the hash functions used by prior art electronic discovery products, the query result deduplicator tool 220 does not have to recalculate the sets of copies in response to the addition of the object U. Similarly, the query result deduplicator tool 220 does not have to recalculate the sets of copies in response to the deletion of any object. The query result deduplicator tool 220 enables a user who submitted a query to save any time that would have been wasted attempting to identify duplicate objects, and save system resources that would have been wasted retrieving and printing duplicate objects unnecessarily.

FIG. 3 illustrates an example portion of a duplicates table for de-duplicating results of queries of multiple data repositories, under an embodiment. A portion of a duplicates table 300 includes a data objects 302 column, a duplicate 304 column, a duplicate set identifier 306 column, and data rows corresponding to the columns 302-306. Only 20 data rows are depicted for 20 duplicate data objects in this simplified example, but some enterprise content management systems may store millions of objects. The portion of the duplicates table 300 indicates that the data object E is a duplicate of the data object A, so the data object E has the same duplicate set identifier 0 as the data object A. Similarly, the portion of the duplicates table 300 indicates that the data object G is also a duplicate of the data object A, so the data object G has the same duplicate set identifier 0 as the data object A and the data object E. The portion of the duplicates table 300 indicates that the data object I is a duplicate of the data object D, so the data object I has the same duplicate set identifier 3 as the data object D. Likewise, the portion of the duplicates table 300 indicates that the data object K is also a duplicate of the data object D, so the data object K has the same duplicate set identifier 3 as the data object D and the data object I. In this manner, the query result deduplicator tool 220 calls a hash function for each of the objects 216-218 stored by the databases 208-210, compares the hash values returned by the hash function to identify which of the objects 216-218 are duplicates of the other objects 216-218 stored by the databases 208-210, and assigns a unique duplicate set identifier to each data object of each set of duplicate data objects. In this example, duplicate set identifiers are numbers assigned in a sequential order to the sets of duplicate data objects as each set of duplicate data objects is identified, but the duplicate set identifiers could include any values other than sequentially increasing numbers.

Figure 4:
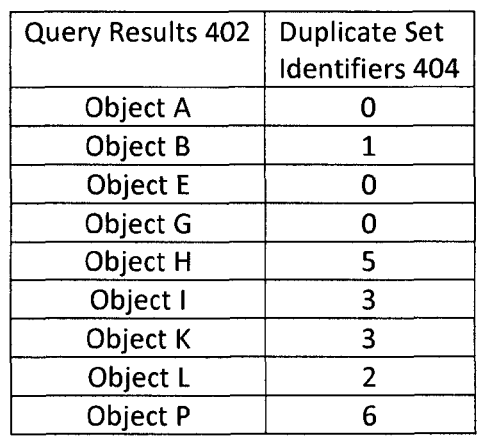
FIG. 4 illustrates an example query result that includes duplicates.

FIG. 4 illustrates an example query result that includes duplicates. A query result table 400 includes a query result 402 column, a duplicate set identifier 404 column, and data rows corresponding to the columns 402-404. The query result table 400 indicates that the query result deduplicator tool 220 identifies the objects A, B, E, G, H, I, K, L, and P as objects that satisfy a user query. However, these query results include duplicate objects, such that outputting these duplicate objects to a user wastes system resources. For example, the query result table 400 indicates that objects A, E, and G all have the same duplicate set identifier 0, and the objects I and K have the same duplicate set identifier 3. Furthermore, although a user may somewhat easily identify which objects in the query result table 400 are duplicates of each other in this simplified example, many electronic discovery queries that search for legal documents to be used in litigation may produce a query result listing hundreds of documents, such that a user may become quite confused while attempting to identify which of the hundreds of documents are duplicates of each other. Additionally, retrieving and printing lengthy duplicate documents out of the hundreds of documents may become an even greater waste of system resources.

Figure 5:
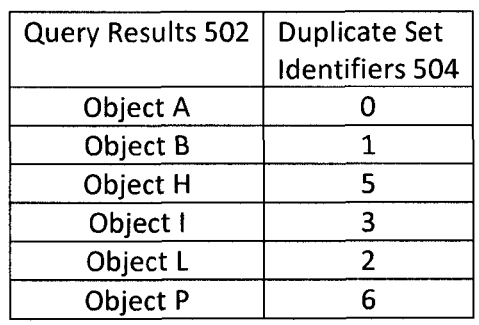
FIG. 5 illustrates an example query result for de-duplicating results of queries of multiple data repositories, under an embodiment.

FIG. 5 illustrates an example query result for de-duplicating results of queries of multiple data repositories, under an embodiment. A query result table 500 includes a query result 502 column, a duplicate set identifier 504 column, and data rows corresponding to the columns 502-504. In contrast to the query result table 400, which indicates that objects A, E, and G all have the same duplicate set identifier 0, and the objects I and K have the same duplicate set identifier 3, the query result deduplicator tool 220 has removed the duplicate objects E, G, and K from the query result table 500, such that the user who submitted the query does not waste time attempting to identify duplicate objects, and system resources and not wasted retrieving and printing duplicate objects unnecessarily.

Figure 6:
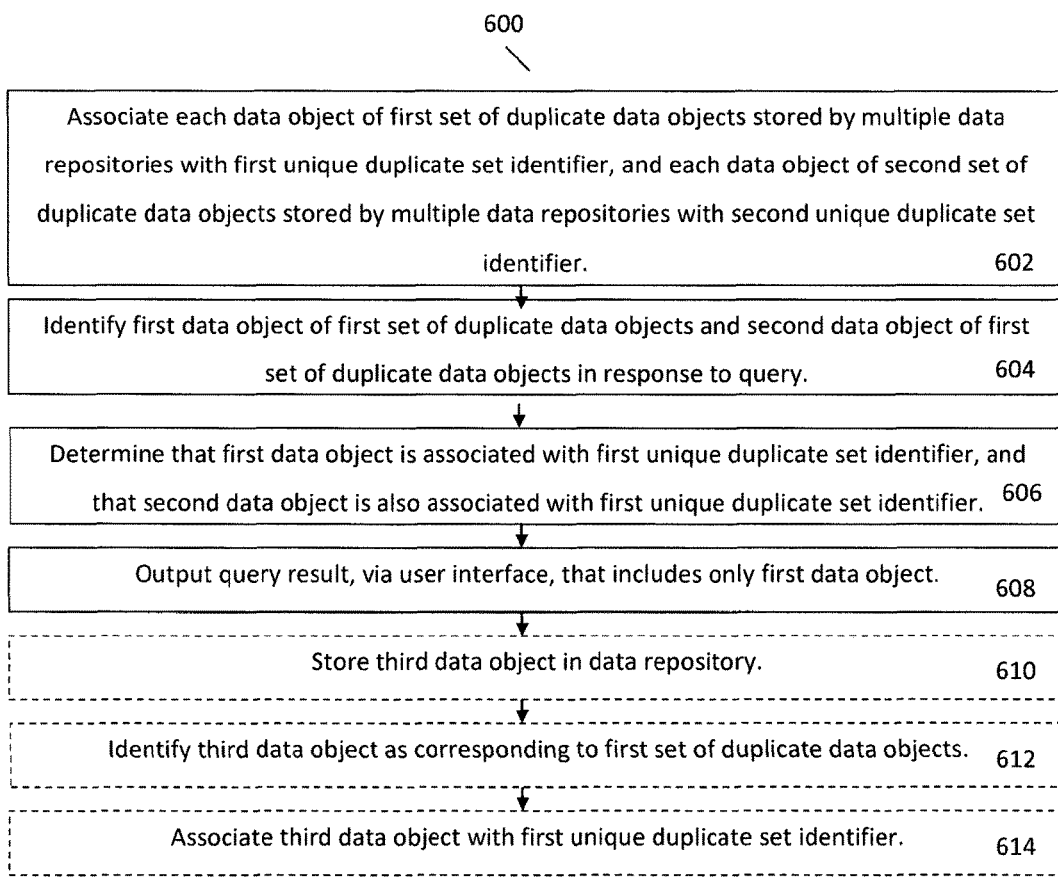
FIG. 6 is a flowchart that illustrates an example method for de-duplicating results of queries of multiple data repositories, under an embodiment.

FIG. 6 is a flowchart that illustrates a method for de-duplicating results of queries of multiple data repositories, under an embodiment. Flowchart 600 illustrates method acts illustrated as flowchart blocks for certain steps involved in and/or between the client 202 and/or the servers 204-206 of FIG. 2. In some embodiments, the method illustrated by the flowchart 600 is executed by a single server, such as server 204.

Each data object of the first set of duplicate data objects stored by multiple data repositories is associated with a first unique duplicate set identifier, and each data object of the second set of duplicate data objects stored by the multiple data repositories is associated with a second unique duplicate set identifier, block 602. For example, the query result deduplicator tool 220 assigns the duplicate set number 1 to the duplicate data objects A and B and assigns the duplicate set number 2 to the duplicate data objects C and D.

A first data object of a first set of duplicate data objects and a second data object of the first set of duplicate data objects are identified in response to a query, block 604. For example, the query result deduplicator tool 220 identifies the data object A stored by the first database 208 and the data object B stored by the second database 210 as both satisfying the query for a custodian named "Bill" and a filepath that equals "/MyDir/sample."

A first data object is determined to be associated with a first unique duplicate set identifier and a second data object is also determined to be associated with the first unique duplicate set identifier, act 606. For example, the query result deduplicator tool 220 identifies the duplicate set number 1 for both of the data objects A and B, which indicates that the data objects A and B are duplicates of each other.

A query result is output that includes only a first data object, block 608. For example, the query result deduplicator tool 220 outputs a query result that identifies only the data object A as satisfying the specified query.

A third data object is optionally stored in a data repository of multiple data repositories, block 610. For example, the query result deduplicator tool 220 stores the object U with the first objects 216 stored by the first database 208.

A third data object is optionally identified as corresponding to a first set of duplicate data objects, block 612. For example, the query result deduplicator tool 220 identifies the object U as a duplicate of the object A, which is also stored with the first objects 216 by the first database 208.

A third data object is optionally associated with a first unique duplicate set identifier, block 614. For example, the query result deduplicator tool 220 assigns the duplicate set number 1, which is already assigned to the object A, to the object U.

Although FIG. 6 depicts the blocks 602-614 occurring in a specific order, the blocks 602-614 may occur in another order. Embodiments herein enable de-duplicating results of queries of multiple data repositories. The query result deduplicator tool 220 enables a user who submitted a query to save any time that would have been wasted attempting to identify duplicate objects, and save system resources that would have been wasted retrieving and printing duplicate objects unnecessarily.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for de-duplicating results of queries of multiple data repositories, the system comprising:
   a processor-based application executed on a computer and configured to:
   identify a plurality of sets of duplicate data objects by comparing a plurality of hash values associated with a plurality of data objects stored in a plurality of data repositories, each data object within each set being a duplicate of the other objects in the set and stored in one of the plurality of separate data repositories;
   assigning each data object within each of the plurality of sets of duplicate data objects a unique duplicate set identifier, the unique duplicate set identifier corresponding to the set of duplicate data objects that includes the associated data object;
   identify at least a first data object and second data object in response to a query, each of the first data object and second data object being stored in one of the plurality of separate data repositories and being associated with a corresponding unique duplicate set identifier one of the plurality of sets of duplicated data objects from the plurality of sets of duplicate data objects;
   determine whether the unique duplicate set identifier associated with the first data object is the same unique duplicate set identifier associated with the second data object; and
   output, in response to a determination that the first data object and the second data object are associated with the same unique duplicate set identifier, a query result that identifies the first data object.

2. The system of claim 1, wherein the plurality of data repositories comprises a plurality of enterprise content management repositories.

3. The system of claim 1, wherein the query comprises at least one of a metadata query and a content query.

4. The system of claim 1, wherein the first data object is stored in a first data format, the second data object is stored in a second data format, and the first data format differs from the second data format.

5. The system of claim 1, wherein neither the first data object nor the second data object is designated as a master copy for the one of the sets of duplicate data objects.

6. The system of claim 1, wherein the processor-based application is further configured to:
   store a third data object in a data repository of the plurality of data repositories;
   identify the third data object as corresponding to the one of the sets of duplicate data objects; and associate the third data object with the unique duplicate set identifier.

7. A computer-implemented method for de-duplicating results of queries of multiple data repositories, the method comprising:

identifying a plurality of sets of duplicate data objects by comparing a plurality of hash values associated with a plurality of data objects stored in a plurality of data repositories, each data object within each set being a duplicate of the other objects in the set and stored in one of the plurality of separate data repositories;

assigning each data object within each of the plurality of sets of duplicate data objects a unique duplicate set identifier, the unique duplicate set identifier corresponding to the set of duplicate data objects that includes the associated data object;

identifying at least a first data object and second data object in response to a query, each of the first data object and second data object being stored in one of the plurality of separate data repositories and being associated with a corresponding unique duplicate set identifier one of the plurality of sets of duplicated data objects from the plurality of sets of duplicate data objects;

determining whether the unique duplicate set identifier associated with the first data object is the same unique duplicate set identifier associated with the second data object; and outputting, in response to a determination that the first data object and the second data object are associated with the same unique duplicate set identifier, a query result that identifies the first data object.

8. The computer-implemented method of claim 7, wherein the plurality of data repositories comprises a plurality of enterprise content management repositories.

9. The computer-implemented method of claim 7, wherein the query comprises at least one of a metadata query and a content query.

10. The computer-implemented method of claim 7, wherein the first data object is stored in a first data format, the second data object is stored in a second data format, and the first data format differs from the second data format.

11. The computer-implemented method of claim 7, wherein neither the first data object nor the second data object is designated as a master copy for the first set of duplicate data objects.

12. The computer-implemented method of claim 7, wherein the method further comprises:

storing a third data object in a data repository of the plurality of data repositories;

identifying the third data object as corresponding to the one of the sets of duplicate data objects; and associating the third data object with the unique duplicate set identifier.

13. A computer program product, comprising a non-transitory computer-readable medium having a computer-readable program code embodied therein to be executed by one or more processors, the program code including instructions to:

identify a plurality of sets of duplicate data objects by comparing a plurality of hash values associated with a plurality of data objects stored in a plurality of data repositories, each data object within each set being a duplicate of the other objects in the set and stored in one of the plurality of separate data repositories;

assigning each data object within each of the plurality of sets of duplicate data objects a unique duplicate set identifier, the unique duplicate set identifier corresponding to the set of duplicate data objects that includes the associated data object;

identify at least a first data object and second data object in response to a query, each of the first data object and second data object being stored in one of the plurality of separate data repositories and being associated with a corresponding unique duplicate set identifier one of the plurality of sets of duplicated data objects from the plurality of sets of duplicate data objects;

determine whether the unique duplicate set identifier associated with the first data object is the same unique duplicate set identifier associated with the second data object; and output, in response to a determination that the first data object and the second data object are associated with the same unique duplicate set identifier, a query result that identifies the first data object.

14. The computer program product of claim 13, wherein the plurality of data repositories comprises a plurality of enterprise content management repositories.

15. The computer program product of claim 13, wherein the query comprises at least one of a metadata query and a content query.

16. The computer program product of claim 13, wherein the first data object is stored in a first data format, the second data object is stored in a second data format, and the first data format differs from the second data format.

17. The computer program product of claim 13, wherein neither the first data object nor the second data object is designated as a master copy for the one of the sets of duplicate data objects.

* * * * *